(12) United States Patent
Okochi et al.

(10) Patent No.: US 11,545,719 B2
(45) Date of Patent: Jan. 3, 2023

(54) LDH SEPARATOR AND SECONDARY ZINC BATTERY

(71) Applicant: NGK INSULATORS, LTD., Nagoya (JP)

(72) Inventors: Sota Okochi, Nagoya (JP); Shohei Yokoyama, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 60 days.

(21) Appl. No.: 16/420,842

(22) Filed: May 23, 2019

(65) Prior Publication Data

US 2019/0280271 A1 Sep. 12, 2019

Related U.S. Application Data

(63) Continuation of application No. PCT/JP2018/046171, filed on Dec. 14, 2018.

(30) Foreign Application Priority Data

Dec. 18, 2017 (JP) .............................. JP2017-241988
Jun. 15, 2018 (JP) .............................. JP2018-114669

(51) Int. Cl.
*H01M 50/446* (2021.01)
*H01M 10/36* (2010.01)
(Continued)

(52) U.S. Cl.
CPC ........... *H01M 50/446* (2021.01); *H01M 4/38* (2013.01); *H01M 10/24* (2013.01); *H01M 10/30* (2013.01);
(Continued)

(58) Field of Classification Search
CPC ............. H01M 50/446; H01M 50/409; H01M 50/449; H01M 12/08; H01M 10/30;
(Continued)

(56) References Cited

U.S. PATENT DOCUMENTS 9,293,791 B2  3/2016  Yamada et al.
10,290,847 B2  5/2019  Kitoh et al.
(Continued)

FOREIGN PATENT DOCUMENTS

CN  101573810 A  11/2009
JP  2013533907 A  8/2013
(Continued)

OTHER PUBLICATIONS

Machine Translation of JP-2016076357-A from Espacenet (Year: 2016).*
(Continued)

*Primary Examiner* — Ula C Ruddock
*Assistant Examiner* — Mary Grace Byram
(74) *Attorney, Agent, or Firm* — Flynn Thiel, P.C.

(57) ABSTRACT

Provided is a layered double hydroxide (LDH) separator capable of more effectively restraining short circuiting caused by zinc dendrites. The LDH separator includes a porous substrate made of a polymer material and LDH plugging pores in the porous substrate, and has a linear transmittance of 1% or more at a wavelength of 1000 nm.

7 Claims, 4 Drawing Sheets

(51) Int. Cl.
*H01M 4/38* (2006.01)
*H01M 12/08* (2006.01)
*H01M 10/30* (2006.01)
*H01M 50/409* (2021.01)
*H01M 50/449* (2021.01)
*H01M 10/24* (2006.01)
*H01M 50/489* (2021.01)
*H01M 50/497* (2021.01)
*H01M 50/491* (2021.01)
*H01M 50/451* (2021.01)
*H01M 10/42* (2006.01)
*H01M 10/32* (2006.01)

(52) U.S. Cl.
CPC ........... *H01M 10/36* (2013.01); *H01M 12/08* (2013.01); *H01M 50/409* (2021.01); *H01M 50/449* (2021.01); *H01M 50/451* (2021.01); *H01M 50/489* (2021.01); *H01M 50/491* (2021.01); *H01M 50/497* (2021.01); *H01M 10/32* (2013.01); *H01M 10/4235* (2013.01)

(58) Field of Classification Search
CPC .. H01M 10/36; H01M 10/4235; H01M 10/32; H01M 10/24; H01M 4/38
See application file for complete search history.

(56) References Cited

U.S. PATENT DOCUMENTS

| | | | | |
|---|---|---|---|---|
| 2002/0031706 | A1* | 3/2002 | Dasgupta | H01M 4/13 429/231.95 |
| 2010/0310921 | A1 | 12/2010 | Hayakawa et al. | |
| 2011/0159362 | A1* | 6/2011 | Wakizaki | H01M 4/13 521/139 |
| 2014/0315099 | A1* | 10/2014 | Yamada | H01M 4/244 429/304 |
| 2016/0268568 | A1* | 9/2016 | Asai | H01M 50/446 |
| 2017/0077476 | A1* | 3/2017 | Kitoh | H01M 50/446 |
| 2017/0214019 | A1 | 7/2017 | Yokoyama et al. | |
| 2017/0373298 | A1* | 12/2017 | Kitoh | H01M 50/183 |

FOREIGN PATENT DOCUMENTS

| | | | | |
|---|---|---|---|---|
| JP | 2016076357 | A * | 5/2016 | |
| JP | 2016076357 | A | 5/2016 | |
| JP | 2016189356 | A * | 11/2016 | ............ H01M 10/28 |
| JP | 201759529 | A | 3/2017 | |
| JP | 6243583 | B1 | 12/2017 | |
| WO | 2013118561 | A1 | 8/2013 | |
| WO | 2016067884 | A1 | 5/2016 | |
| WO | 2016076047 | A1 | 5/2016 | |
| WO | WO-2016076047 | A1 * | 5/2016 | .......... H01M 50/431 |
| WO | WO-2016121168 | A1 * | 8/2016 | .......... H01M 50/449 |

OTHER PUBLICATIONS

English translation of Written Opinion of the International Searching Authority for PCT/JP2018/046171, dated Sep. 16, 2019 (5 pages).
International Search Report issued in International Application No. PCT/JP2018/046171, with English translation, dated Jan. 29, 2019 (3 pages).
Written Opinion of International Searching Authority issued in International Application No. PCT/JP2018/046171, with English translation, dated Jan. 29, 2019 (6 pages).
Extended European Search Report and opinion for corresponding Application No. 18880067.6, dated Jul. 14, 2020 (7 pages).
Chinese Office Action with English Translation issued in corresponding Chinese Application No. 201880004426.0 dated May 26, 2022 (9 pages).
Chinese Office Action, with English translation, issued in corresponding Chinese Application No. 201880004426.0, dated Nov. 1, 2022 (7 pages).
Biomass Energy Engineering edited by Sun Chuanbo, p. 194, ISBN: 978-7-5650-2294-4, Hefei University of Technology Press, Sep. 2015 (6 pages).

* cited by examiner

LDH SEPARATOR AND SECONDARY ZINC BATTERY

CROSS-REFERENCE TO RELATED APPLICATIONS

This is a continuation of PCT/JP2018/046171 filed Dec. 14, 2018, which claims priority to Japanese Patent Application No. 2017-241988 filed Dec. 18, 2017, and Japanese Patent Application No. 2018-114669 filed Jun. 15, 2018, the entire contents of which are hereby incorporated by reference.

BACKGROUND OF THE INVENTION

1. Field of the Invention

The present invention relates to a LDH separator and a secondary zinc battery.

2. Description of the Related Art

In secondary zinc batteries, such as secondary nickel-zinc batteries and secondary air-zinc batteries, it is known that metallic zinc dendrites precipitate on negative electrodes during a charge mode, penetrate through voids in separators composed of, for example, non-woven fabrics, and reach positive electrodes, resulting in a short circuit. The short circuit caused by such zinc dendrites occurs during repeated charge/discharge operations, leading to a reduction in service lives of the secondary zinc batteries.

In order to solve such a problem, secondary zinc batteries have been proposed that include layered double hydroxide (LDH) separators that selectively permeate hydroxide ions while blocking the penetration of zinc dendrites. For example, PTL 1 (WO2013/118561) discloses a secondary nickel-zinc battery including a LDH separator disposed between a positive electrode and a negative electrode. PTL 2 (WO2016/076047) discloses a separator structure including a LDH separator that is fit in or joined to a resin frame and is dense enough to restrict the permeation of gas and/or water. PTL 2 also discloses that the LDH separator may be a composite with a porous substrate. In addition, PTL 3 (WO 2016/067884) discloses various methods for forming a dense LDH membrane on the surface of a porous substrate to give a composite material (a LDH separator). These methods include the steps of: uniformly bonding an initiating material capable of giving origins of crystal growth of LDH to the porous substrate; and then subjecting the porous substrate to hydrothermal treatment in an aqueous raw material solution to form a dense LDH membrane on the surface of the porous substrate.

CITATION LIST

Patent Literature

PTL1: WO2013/118561
PTL2: WO2016/076047
PTL3: WO2016/067884

SUMMARY OF THE INVENTION

In the case that secondary zinc batteries, for example, nickel-zinc batteries, are constructed with a LDH separator as described above, the problem such as short circuiting caused by zinc dendrites can be effectively prevented to some extent. However, a further improvement is desired for a preventive effect of the short circuiting caused by the dendrites.

The present inventors have now found that a LDH separator that can more effectively restrain the short circuiting caused by zinc dendrites can be provided, in which pores of a polymeric porous substrate are filled with the LDH to densify to an extent that a linear transmittance reaches 1% or more at a wavelength of 1000 nm.

Accordingly, an object of the present invention is to provide a LDH separator capable of more effectively restraining the short circuiting caused by zinc dendrites.

According to an embodiment of the present invention, a LDH separator is provided, the separator comprising a porous substrate composed of a polymeric material and a layered double hydroxide (LDH) that can plug the pores in the porous substrate, and having a linear transmittance of 1% or more at a wavelength of 1000 nm.

According to another embodiment of the present invention, a secondary zinc battery is provided comprising the LDH separator described above.

DETAILED DESCRIPTION OF THE INVENTION

LDH Separator

Figure 1A:
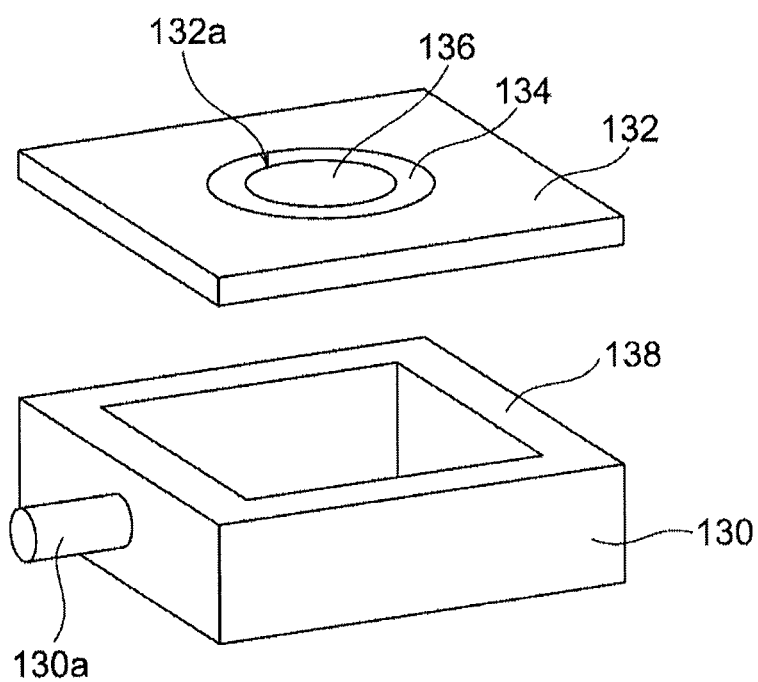
FIG. 1A is an exploded perspective view of a closed container used in the determination of density in Examples 1 to 4.

The LDH separator of the present invention comprises a porous substrate and a layered double hydroxide (LDH). In the present specification, "LDH separator" includes the LDH and is defined as a separator that can selectively penetrate hydroxide ions due to mainly hydroxide ionic conductivity of the LDH. The porous substrate is composed of a polymeric material, and the pores in the porous substrate are filled with the LDH. The LDH separator has a linear transmittance of 1% or more at a wavelength of 1000 nm. The linear transmittance of 1% or more at a wavelength of 1000 nm indicates that the pores in the porous substrate are sufficiently filled with the LDH and the substrate can transmit light. In other words, the pores remaining in the porous substrate causes light scattering to preclude the light transmission, whereas the pores sufficiently filled with the LDH in the porous substrate reduces light scattering to yield light transmission. Thus, plugging the pores in the porous polymeric substrate with the LDH causes the density to an extent that the linear transmittance is 1% or more at a wavelength of 1000 nm, resulting in providing an LDH separator that can further effectively restrain the short circuiting caused by zinc dendrites. In a conventional separator, penetration of zinc dendrites is assumed to occur by the following mechanism: (i) zinc dendrites intrude into voids or defects contained in the separator; (ii) the dendrites are grown or developed while expanding the voids or defects in the separator; and (iii) the dendrites finally penetrate the separator. In contrast, the LDH separator of the present invention supplies no space for penetration and development of zinc dendrites, because the pores in the porous substrate are densified in such a manner that the pores are sufficiently filled with the LDH to an extent that the linear transmittance is measured to be 1% or more at a wavelength of 1000 nm. Thereby, the short circuiting caused by the zinc dendrites can be more effectively restrained.

Furthermore, the LDH separator of the present invention has excellent flexibility and strength, as well as a desired ionic conductivity based on the hydroxide ionic conductivity of the LDH. The flexibility and strength are caused by those of the polymeric porous substrate itself of the LDH separator. In other words, the LDH separator is densified in such a manner that the pores of the porous polymer substrate are sufficiently filled with the LDH, and the porous polymeric substrate and the LDH are highly integrated into a superior composite material, thereby high rigidity and low ductility caused by the LDH, which is a ceramic material, can be balanced with or reduced by a high flexibility and high strength of the porous polymeric substrate.

The LDH separator of the present invention has a linear transmittance in the range of 1% or more, preferably 5% or more, more preferably 10% or more, further more preferably 15% or more, particularly more preferably 20% or more at a wavelength of 1000 nm. If the linear transmittance is within the above range, the pores in the porous substrate is sufficiently filled with the LDH to densify the substrate and thus to exhibit light transmission; hence, the short circuiting caused by zinc dendrites can be more effectively restrained. A higher linear transmittance of the LDH separator at a wavelength of 1000 nm can more effectively restrain the short circuiting, thus the LDH separator may have any upper limit of linear transmittance, typically 95% or less, more typically 90% or less. The linear transmittance is preferably measured with a spectrophotometer (e.g., Lambda 900 available from Perkin Elmer) under the following conditions: a wavelength range including 1000 nm (e.g., 200 to 2500 nm); a scanning rate of 100 nm/min; and a sample area of 5×10 mm. If the LDH separator has a rough surface, it is preferred that the surface of the LDH separator be filled with a non-colored material with a refractive index approximately the same as that of the porous polymeric substrate into a smooth surface with an arithmetic mean roughness Ra of about 10 μm or less before measurement. The reason why the linear transmittance is measured at a wavelength of 1000 nm is that this measurement of the linear transmittance should be desirably performed within the wavelengths that the influence of light scattering caused by the pores that may remain in the porous substrate can be readily determined (i.e., the influence of absorption is small), and a near-infrared region of 700 nm or more is preferred for the LDH separator of the present invention from the above viewpoint.

The LDH separator of the present invention has an ionic conductivity of preferably 0.1 mS/cm or more, more preferably 0.5 mS/cm or more, further more preferably 1.0 mS/cm or more. Such a range allows the LDH separator to fully function as a separator having a hydroxide ionic conductivity. Since a higher ionic conductivity is preferred, the LDH separator may have any upper limit of ionic conductivity, for example, 10 mS/cm. The ionic conductivity is calculated from the resistance, the thickness and the area of the LDH separator. The resistance of the LDH separator is measured within a frequency range of 1 MHz to 0.1 Hz and under an applied voltage of 10 mV using an electrochemical measurement system (potentio-galvanostat frequency responsive analyzer) for the LDH separator immersed in an aqueous KOH solution of a predetermined concentration (for example, 5.4 M), and the intercept across the real axis can be determined to be the resistance of the LDH separator.

The LDH separator includes a layered double hydroxide (LDH), and can isolate a positive electrode plate from a negative electrode plate and ensures a hydroxide ionic conductivity therebetween in a secondary zinc battery. The LDH separator functions as a hydroxide ionic conductive separator. A preferred LDH separator has a gas-impermeability and/or water-impermeability. In other words, the LDH separator is preferably densified to an extent that exhibits a gas-impermeability and/or water-impermeability. The phrase "having a gas-impermeability" throughout the specification indicates that no bubbling of helium gas is observed at one side of a sample when helium gas is brought into contact with the other side in water at a differential pressure of 0.5 atm as described in PTLs 2 and 3. In addition, the phrase "having a water-impermeability" throughout the specification indicates that water in contact with one side of the sample does not permeate to the other side as described in PTLs 2 and 3. As a result, the LDH separator having a gas-impermeability and/or water-impermeability indicates having a high density to an extent that no gas or no water permeates, and not being a porous membrane or any other porous material that has a gas-permeability or water-permeability. Accordingly, the LDH separator can selectively permeate only hydroxide ions due to its hydroxide ionic conductivity, and can serve as a battery separator. The LDH separator thereby has a physical configuration that prevents the penetration of zinc dendrites generated during a charge mode through the separator, resulting in the prevention of short circuiting between positive and negative electrodes. Since the LDH separator has a hydroxide ionic conductivity, the ionic conductivity allows a necessary amount of hydroxide ions to efficiently move between the positive electrode plate and the negative electrode plate, and thereby a charge/discharge reaction can be achieved on the positive electrode plate and the negative electrode plate.

The LDH separator preferably has a helium permeability per unit area of 3.0 cm/min·atm or less, more preferably 2.0 cm/min·atm or less, further more preferably 1.0 cm/min·atm or less. A separator having a helium permeability of 3.0 cm/min·atm or less can remarkably restrain the permeation of Zn (typically, the permeation of zinc ions or zincate ions) in the electrolytic solution. Thus, it is conceivable in principle that the separator of the present embodiment can effectively restrain the growth of zinc dendrites when used in secondary zinc batteries because the Zn permeation is significantly suppressed. The helium permeability is measured through the steps of: supplying helium gas to one side of the separator to allow the helium gas to permeate into the separator; and calculating the helium permeability to evaluate the density of the hydroxide ion conductive separator. The helium permeability is calculated from the expression of $F/(P \times S)$ where F is the volume of permeated helium gas per unit time, P is the differential pressure applied to the separator when helium gas permeates through, and S is the area of the membrane through which helium gas permeates. Evaluation of the permeability of helium gas in this manner can extremely precisely determine the density. As a result, a high degree of density that does not permeate as much as possible (or permeate only a trace amount) substances other than hydroxide ions (in particular, zinc that causes deposition of dendritic zinc) can be effectively evaluated. Helium gas is suitable for this evaluation because the helium gas has the smallest constitutional unit among various atoms or molecules which can constitute the gas and its reactivity is extremely low. That is, helium does not form a molecule, and helium gas is present in the atomic form. In this respect, since hydrogen gas is present in the molecular form ($H_2$), atomic helium is smaller than molecular $H_2$ in a gaseous state. Basically, $H_2$ gas is combustible and dangerous. By using the helium gas permeability defined by the above expression as an index, the density can be precisely and readily evaluated regardless of differences in sample size and measurement condition. Thus, whether the separator has a sufficiently high density suitable for separators of secondary zinc batteries can be evaluated readily, safely and effectively. The helium permeability can be preferably measured in accordance with the procedure shown in Evaluation 5 in Examples described later.

In the LDH separator of the present invention, the pores in the porous substrate are filled with the LDH, preferably completely filled with the LDH. As is generally known, the LDH is composed of a plurality of basic hydroxide layers and intermediate layers interposed between these basic hydroxide layers. The basic hydroxide layers are each mainly composed of metallic elements (typically metallic ions) and OH groups. The intermediate layers of the LDH are composed of anions and $H_2O$. The anions are monovalent or multivalent anions, preferably monovalent or divalent ions. The anions in the LDH preferably include $OH^-$ and/or $CO_3^{2-}$. The LDH has a high ionic conductivity based on its inherent properties.

In general, the LDH is known to typically have the fundamental formula: $M^{2+}_{1-x}M^{3+}_x(OH)_2A^{n-}_{x/n} \cdot mH_2O$ (wherein, $M^{2+}$ is a divalent cation, $M^{3+}$ is a trivalent cation, $A^{n-}$ is n-valent anion, n is an integer of 1 or more, x is 0.1 to 0.4, and m is 0 or more). In the above fundamental formula, $M^{2+}$ may be any divalent cation, and includes, preferably $Mg^{2+}$, $Ca^{2+}$ and $Zn^{2+}$, more preferably $Mg^{2+}$. $M^{3+}$ may be any trivalent cation, and includes, preferably $Al^{3+}$ and $Cr^{3+}$, more preferably $Al^{3+}$. $A^{n-}$ may be any anion, and preferably includes $OH^-$ and $CO_3^{2-}$. Accordingly, it is preferred that $M^{2+}$ includes $Mg^{2+}$, $M^{3+}$ includes $Al^{3+}$, and $A^{n-}$ includes $OH^-$ and/or $CO_3^{2-}$ in the above fundamental formula. n is an integer of 1 or more, preferably 1 or 2. x is 0.1 to 0.4, preferably 0.2 to 0.35. is an any molar number of water, and is a real number of 0 or more, typically a real number of more than 0 or 1 or more. However, the above fundamental formula merely represents "a fundamental composition" typically illustrated for the LDH, and constituent ions can be appropriately replaced. For example, in the above fundamental formula, part or the whole of $M^{3+}$ may be replaced with a tetravalent or higher valence cation, where the coefficient x/n of the anion $A^{n-}$ may be appropriately varied in the above fundamental formula.

For example, the basic hydroxide layers of LDH may be composed of Ni, Ti, OH groups and optional incidental impurities. The intermediate layers of LDH are composed of anions and $H_2O$ as described above. Although the alternately stacked structure itself of basic hydroxide layers and intermediate layers is basically the same as the commonly known alternately stacked structure of LDH, the LDH of the embodiment, which is composed of the basic hydroxide layers mainly having Ni, Ti and OH groups of LDH, can exhibit a high alkaline resistance. Although the reason is not clear, it is believed that no element (for example, Al) readily dissolved in an alkaline solution is intentionally added to the LDH of the embodiment. Nevertheless, the LDH of the embodiment can also exhibit a high ionic conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Ti in the LDH can have the form of titanium ions. Although titanium ions in the LDH are typically believed to be $Ti^{4+}$, they may be present in any other valence, for example, $Ti^{3+}$. Each of the incidental impurities is any element which may be inevitably mixed in a manufacturing process, and it may be mixed into the LDH from, for example, a raw material or a substrate. As described above, it is impractical or impossible to strictly specify the LDH with a general formula since valences of Ni and Ti are not necessarily confirmed. Assuming that the basic hydroxide layers are mainly composed of $Ni^{2+}$, $Ti^{4+}$ and OH groups, the fundamental composition of the corresponding LDH can be represented by the general formula: $Ni^{2+}_{1-x}Ti^{4+}_x(OH)_2A^{n-}_{2x/n} \cdot mH_2O$, wherein $A^{n-}$ is an n-valent anion, n is an integer of 1 or more, preferably 1 or 2, x is above 0 to below 1, preferably 0.01 to 0.5, and m is a real number of 0 or more, typically a real number above 0 or 1 or more. However, it should be understood that the general formula indicates merely the "fundamental composition", and it may be replaced with other elements or ions (including elements with other valences of the same element, or elements or ions that may be unavoidably mixed in the manufacturing process) to such an extent that the elements such as $Ni^{2+}$, and $Ti^{4+}$ do not impair the basic properties of LDH.

Alternatively, the basic hydroxide layers of LDH comprise Ni, Al, Ti and OH groups. The intermediate layers are composed of anions and $H_2O$ as described above. Although the alternately stacked structure itself of basic hydroxide layers and intermediate layers is basically the same as the generally known alternately stacked structure of LDH, the LDH of the embodiment, in which the basic hydroxide layers of the LDH are composed of predetermined elements and/or ions including Ni, Al, Ti and OH groups, can exhibit a high alkaline resistance. Although the reason is not clear, it is believed that Al, which has been considered to be readily dissolved in an alkaline solution, is hard to elute into the alkaline solution due to some interaction with Ni and Ti. Nevertheless, the LDH of the embodiment can also exhibit a high ionic conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Al in the LDH can have the form of aluminum ions. Although aluminum ions in the LDH are typically believed to be $Al^{3+}$, they may be present in any other valence. Ti in the LDH can have the form of titanium ions. Although titanium ions in the LDH are typically believed to be $Ti^{4+}$, they may be present in any other valence, for example, $Ti^{3+}$. The basic hydroxide layers may contain other elements or ions as long as they contain Ni, Al, Ti and OH groups. However, the basic hydroxide layers preferably contain Ni, Al, Ti and OH groups as main constituent elements. That is, it is preferred that the basic hydroxide layers are mainly composed of Ni, Al, Ti and OH groups. Accordingly, the basic hydroxide layers are typically composed of Ni, Al, Ti, OH groups and optional incidental impurities. Each of the incidental impurities is any element which may be inevitably mixed in a manufacturing process, and it may be mixed into the LDH from, for example, a raw material or a substrate. As described above, it is impractical or impossible to strictly specify the LDH with a general formula since the valences of Ni, Al and Ti are not necessarily confirmed. Assuming that the basic hydroxide layers are mainly composed of $Ni^{2+}$, $Al^{3+}$, $Ti^{4+}$ and OH groups, the fundamental composition of the corresponding LDH can be represented by the general formula: $Ni^{2+}_{1-x-y}Al^{3+}_{x}Ti^{4+}_{y}(OH)_2A^{n-}_{(x+2y)/n} \cdot mH_2O$, wherein $A^{n-}$ is an n-valent anion, n is an integer of 1 or more, preferably 1 or 2, x is above 0 to below 1, preferably 0.01 to 0.5, y is above 0 to below 1, preferably 0.01 to 0.5, x+y is above 0 to below 1, and m is a real number of 0 or more, typically a real number of above 0 or 1 or more. However, it should be understood that the general formula indicates merely the "fundamental composition", and it may be replaced with other elements or ions (including elements with other valences of the same element, or elements or ions that may be unavoidably mixed in the manufacturing process) to such an extent that the elements such as $Ni^{2+}$, $Al^{3+}$ and $Ti^{4+}$ do not impair the basic properties of LDH.

As described above, the LDH separator comprises the LDH and the porous substrate (typically consists of the porous substrate and the LDH), and the LDH plugs the pores in the porous substrate such that the LDH separator exhibits a hydroxide ionic conductivity and gas-impermeability (thus, so as to serve as a LDH separator exhibiting a hydroxide ionic conductivity). In particular, the LDH is preferably embedded over the entire thickness of the porous substrate composed of a polymeric material. The LDH separator has a thickness of preferably 5 to 80 µm, more preferably 5 to 60 µm, further more preferably 5 to 40 µm.

The porous substrate is composed of a polymeric material. The polymeric porous substrate has the following advantages; (1) a high flexibility (hard to crack even if thinned), (2) a high porosity, (3) a high conductivity (small thickness with high porosity), and (4) a good manufacturability and handling ability. The polymeric porous substrate has a further advantage; (5) readily folding and sealing the LDH separator including the porous substrate composed of the polymeric material based on the advantage (1): a high flexibility. Preferred examples of the polymeric material include polystyrene, poly(ethersulfone), polypropylene, epoxy resin, poly(phenylene sulfide), fluorocarbon resin (tetra-fluorinated resin such as PTFE), cellulose, nylon, polyethylene and any combination thereof. More preferred examples include polystyrene, poly(ethersulfone), polypropylene, epoxy resin, poly(phenylene sulfide), fluorocarbon resin (tetra-fluorinated resin such as PTFE), nylon, polyethylene and any combination thereof from the viewpoint of a thermoplastic resin suitable for hot pressing. All the various preferred materials described above have an alkali resistance to be resistant to the electrolytic solution of batteries. More preferred polymeric materials are polyolefins, such as polypropylene and polyethylene, most preferred are polypropylene and polyethylene from the viewpoint of excellent hot-water resistance, acid resistance and alkali resistance, and low material cost. In case that the porous substrate is composed of the polymeric material, the LDH layer is particularly preferably embedded over the entire thickness of the porous substrate (for example, most pores or substantially all pores inside the porous substrate are filled with the LDH). A polymeric microporous membrane commercially available can be preferably used as such a polymeric porous substrate.

Process

The LDH separator of the present invention is manufactured by the steps of: (i) preparing an LDH-containing composite material (i.e., a crude LDH separator) according to a known procedure using a polymeric porous substrate, and (ii) pressing the LDH-containing composite material. The step of pressing may be performed by any procedure, such as roll pressing, uniaxial pressure pressing, and CIP (cold isostatic pressing), preferably roll pressing. This step of pressing preferably involves heating of the composite material to soften the polymeric porous substrate and thereby to sufficiently plug the pores in the porous substrate with the LDH. For example, the heating temperature required for enough softening is preferably 60° C. or higher in the case that the polymer is polypropylene. In the roll pressing, a LDH separator having the desired density and light transmission (which can be evaluated by a linear transmittance at a wavelength of 1000 nm) can be yielded through appropriately adjusting a gap between rollers. However, the step of pressing is not absolutely necessary if the pores in the porous substrate are sufficiently filled with the LDH into a high density state. In this case, even without the step of pressing, an LDH separator can be given that has a density and light transmission (which can be evaluated by a linear transmittance at a wavelength of 1000 nm) similar to the LDH separator produced through the step of pressing.

The LDH-containing composite material (i.e., the crude LDH separator) before the step of pressing can be produced by any process, preferably by appropriate modification of various conditions in known methods (e.g., see PTLs 1 to 3) for producing the LDH-containing functional layer and the composite material (that is, the LDH separator). For example, the LDH-containing functional layer and the composite material (that is, the LDH separator) can be produced by the Steps of: (1) providing a porous substrate; (2) applying a titanium oxide sol or a mixed sol of alumina and titania onto the porous substrate and then heating the sol to form a titanium oxide layer or an alumina/titania layer; (3) immersing the porous substrate into an aqueous raw material solution containing nickel ions ($Ni^{2+}$) or magnesium ion ($Mg^{2+}$) and urea; and (4) hydrothermally treating the porous substrate in the aqueous raw material solution to form the LDH-containing functional layer on the porous substrate and/or in a porous substrate. In particular, in Step (2), forming the titanium oxide layer or the alumina/titania layer on the porous substrate can not only produce a raw material for the LDH, but also serve as a seed of LDH crystalline growth and uniformly form the LDH containing functional layer that is highly densified on the surface of the porous substrate. In addition, in Step (3), the presence of urea raises the pH value by the generation of ammonia in the solution through the hydrolysis of urea, and gives the LDH by the formation of hydroxide with coexisting metal ions. Also, the generation of carbon dioxide in the hydrolysis gives an LDH of a carbonate anion type.

In particular, a composite material (that is, the LDH separator) in which the porous substrate is composed of a polymeric material and the functional layer is embedded over the porous substrate in the thickness direction is produced by applying the mixed sol of alumina and titania to the substrate in Step (2) such that the mixed sol permeates into all or most of the area of the interior pores of the substrate. By this manner, most or substantially all the pores inside the porous substrate can be embedded with the LDH. Examples of preferred application methods include dip coating and filtration coating. Particularly preferred is dip coating. The amount of the deposited mixed sol can be varied by adjusting the number of times of coating such as dip coating. The substrate coated with the mixed sol by, for example, dip coating may be dried and then subjected to Steps (3) and (4).

Secondary Zinc Batteries

The LDH separator of the present invention is preferably applied to secondary zinc batteries. According to a preferred embodiment of the present invention, a secondary zinc battery comprising the LDH separator are provided. A typical secondary zinc battery includes a positive electrode, a negative electrode, and an electrolytic solution, and isolates the positive electrode from the negative electrode with the LDH separator therebetween. The secondary zinc battery of the present invention may be of any type that includes a zinc negative electrode and an electrolytic solution (typically, an aqueous alkali metal hydroxide solution). Accordingly, examples of the secondary zinc battery include secondary nickel-zinc batteries, secondary silver oxide-zinc batteries, secondary manganese oxide-zinc batteries, secondary zinc-air batteries, and various other secondary alkaline zinc batteries. For example, the secondary zinc battery may preferably be a secondary nickel-zinc battery, the positive electrode of which contains nickel hydroxide and/or nickel oxyhydroxide. Alternatively, the secondary zinc battery may be a secondary zinc-air battery, the positive electrode of which is an air electrode.

Other Batteries

The LDH separator of the present invention can be used not only in secondary zinc batteries such as nickel-zinc batteries but also in, for example, nickel-hydrogen batteries. In this case, the LDH separator serves to block a nitride shuttle (movement of nitrate groups between electrodes), which is a factor of the self-discharging in the battery. The LDH separator of the present invention can also be applied in, for example, lithium batteries (batteries having a negative electrode composed of lithium metal), lithium-ion batteries (batteries having a negative electrode composed of, for example, carbon), or lithium-air batteries.

EXAMPLES

The invention will be further described in more detail by the following Examples. The following procedures were used to evaluate the LDH separator produced in these Examples.

Evaluation 1: Identification of LDH Separator

The crystalline phase of the functional layer was measured with an X-ray diffractometer (RINT TTR III manufactured by Rigaku Corporation) at a voltage of 50 kV, a current of 300 mA, and a measuring range of 10° to 70° to give an XRD profile. The resultant XRD profile was identified with the diffraction peaks of LDH (hydrotalcite compound) described in JCPDS card NO.35-0964.

Evaluation 2: Determination of Density

Figure 1B:
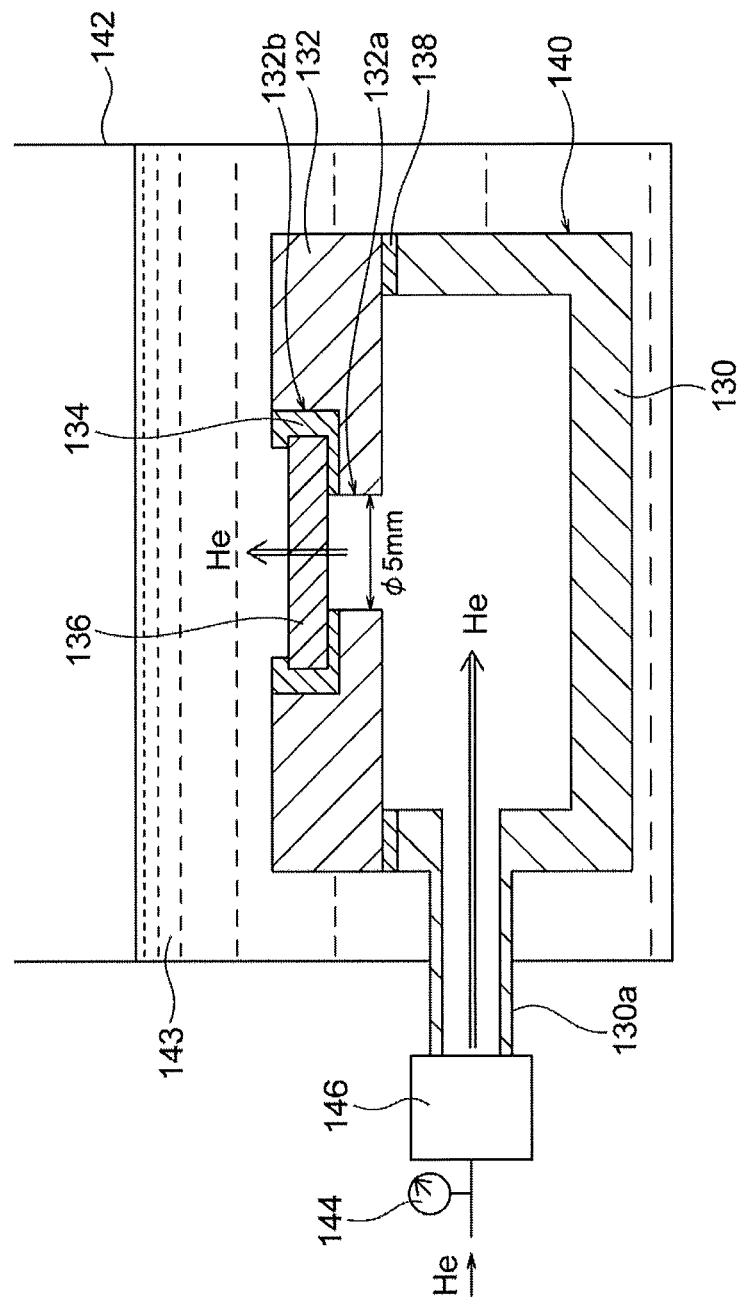
FIG. 1B is a schematic cross-sectional view of the measurement system used in the determination of density in Examples 1 to 4.

The density was determined to confirm that the LDH separator had a density having no gas permeability. As shown in FIGS. 1A and 1B, an open acrylic container 130 and an alumina jig 132 with a shape and dimensions capable of working as a cover of the acrylic container 130 were provided. The acrylic container 130 was provided with a gas supply port 130a. The alumina jig 132 had an opening 132a having a diameter of 5 mm and a cavity 132b surrounding the opening 132a for placing the sample. An epoxy adhesive 134 was applied onto the cavity 132b of the alumina jig 132. The LDH separator 136 was placed into the cavity 132b and was bonded to the alumina jig 132 in an air-tight and liquid-tight manner. The alumina jig 132 with the LDH separator 136 was then bonded to the upper end of the acrylic container 130 in an air-tight and liquid-tight manner with a silicone adhesive 138 to completely seal the open portion of the acrylic container 130. A hermetic container 140 was thereby completed for the measurement. The hermetic container 140 for the measurement was placed in a water vessel 142 and the gas supply port 130a of the acrylic container 130 was connected to a pressure gauge 144 and a flow meter 146 so that helium gas was supplied into the acrylic container 130. Water 143 was poured in the water vessel 142 to completely submerge the hermetic container 140 for the measurement. At this time, the air-tightness and liquid-tightness were sufficiently kept in the interior of the hermetic container 140 for the measurement, and one surface of the LDH separator 136 was exposed to the internal space of the hermetic container 140 for the measurement while the other surface of the LDH separator 136 was in contact with water in the water vessel 142. In this state, helium gas was introduced into the acrylic container 130 of the hermetic container 140 for the measurement through the gas supply port 130a. The pressure gauge 144 and the flow meter 146 were controlled such that the differential pressure between the inside and outside of LDH separator 136 reached 0.5 atm (that is, the pressure applied to one surface of the helium gas is 0.5 atm higher than the water pressure applied to the other surface), to observe whether or not bubbling of helium gas occurred in water from the LDH separator 136. When bubbling of helium gas was not observed, the LDH separator 136 was determined to have a high density with no gas permeability.

Evaluation 3: Measurement of Linear Transmittance

The linear transmittance of the LDH separator was measured by a spectrophotometer (Lambda 900, available from Perkin Elmer) at a wavelength range of 200 to 2500 nm, at a scanning rate of 100 nm/min, and an area of measurement of 5×10 mm.

Evaluation 4: Test of Short Circuiting Caused by Dendrites

Figure 2:
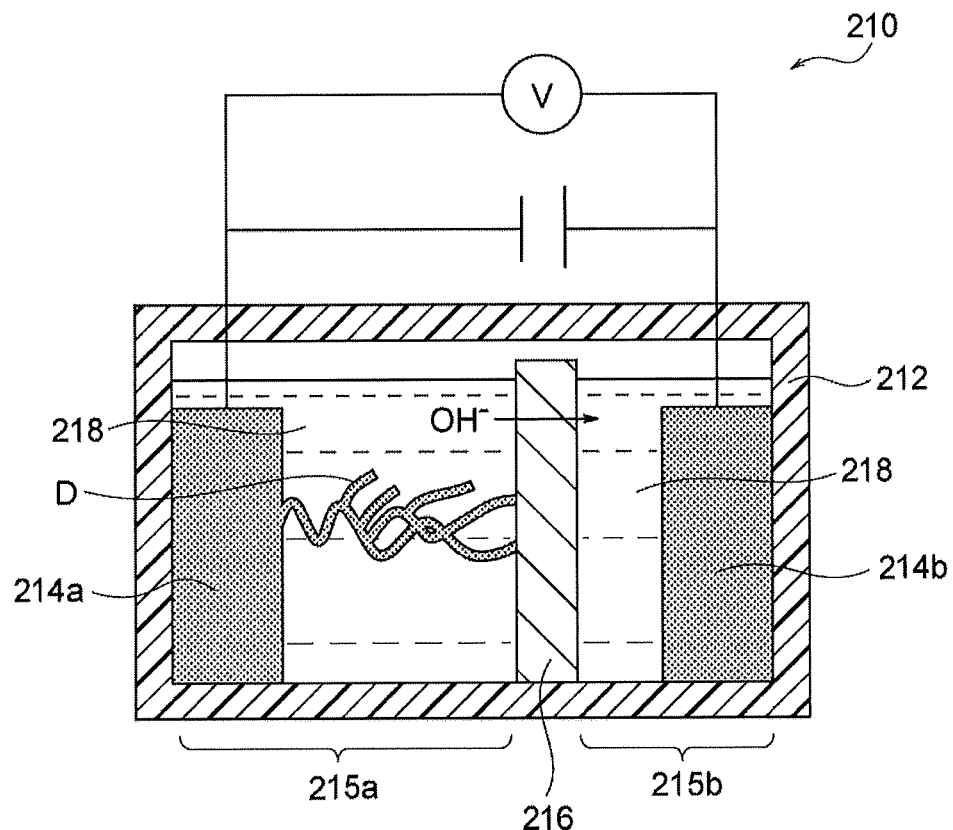
FIG. 2 is a schematic cross-sectional view of a measurement device used in the determination of short circuiting caused by dendrites D in Examples 1 to 4.

A measurement device 210 was assembled as shown in FIG. 2 and an accelerated test was carried out to continuously grow zinc dendrites. Specifically, a rectangular container 212 made of an ABS resin was prepared, in which a zinc electrode 214a is separated by 0.5 cm from a copper electrode 214b to face each other. The zinc electrode 214a is a metal zinc plate, and the copper electrode 214b is a metal copper plate. In addition, a LDH separator structure including the LDH separator 216 was constructed, such that an epoxy resin-based adhesive was applied along the outer periphery of the LDH separator, and the LDH separator was bonded to a jig made of an ABS resin having an opening at the center. At this time, the bonded area between the jig and the LDH separator was sufficiently sealed with the adhesive to ensure liquid-tightness. The LDH separator structure was then disposed in the container 212 to isolate a first section 215a including the zinc electrode 214a from a second section 215b including the copper electrode 214b, inhibiting liquid communication other than the area of the LDH separator 216. In this configuration, three outer edges of the LDH separator structure (or three outer edges of the jig made of ABS resin) were bonded to the inner wall of the container 212 with an epoxy resin adhesive to ensure liquid-tightness. In other words, the bonded area between the separator structure including the LDH separator 216 and the container 212 was sealed to inhibit the liquid communication. 5.4 mol/L aqueous KOH solution as an aqueous alkaline solution 218 was poured into the first section 215a and the second section 215b along with ZnO powders equivalent to saturated solubility. The zinc electrode 214a and the copper electrode 214b were connected to a negative terminal and a positive terminal of the constant-current power supply, respectively, and a voltmeter was also connected in parallel with the constant-current power supply. The liquid level of the aqueous alkaline solution 218 was determined below the height of the LDH separator structure (including the jig) such that the entire area of the LDH separator 216 in both the first section 215a and the second section 215b was immersed in the aqueous alkaline solution 218. In the measurement device 210 having such a configuration, a constant current of 20 mA/cm$^2$ was continuously applied between the zinc electrode 214a and the copper electrode 214b for up to 200 hours. During application of the constant current, the voltage between the zinc electrode 214a and the copper electrode 214b was monitored with a voltmeter to check for short circuiting caused by zinc dendrites (a sharp voltage drop) between the zinc electrode 214a and the copper electrode 214b. No short circuiting for over 100 hours was determined as "(short circuit) not found", and short circuiting within less than 100 hours was determined as "(short circuit) found".

Evaluation 5: Helium Permeability

Figure 3A:
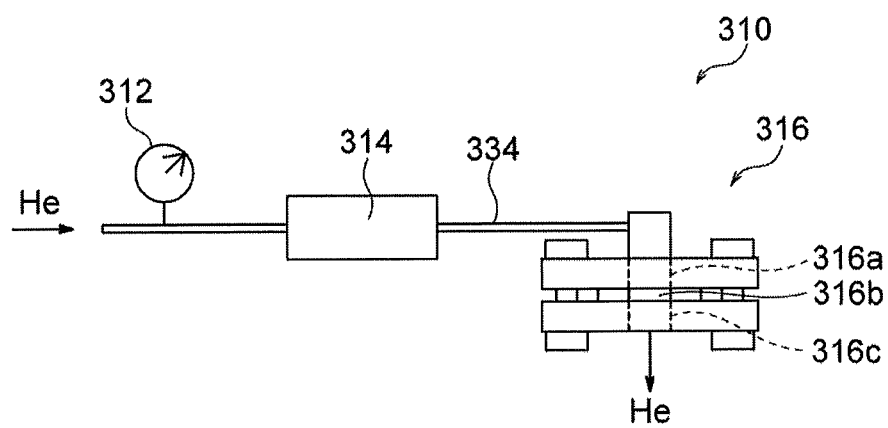
FIG. 3A is a conceptual view illustrating an example system for measuring helium permeability used in Examples 1 to 4.
Figure 3B:
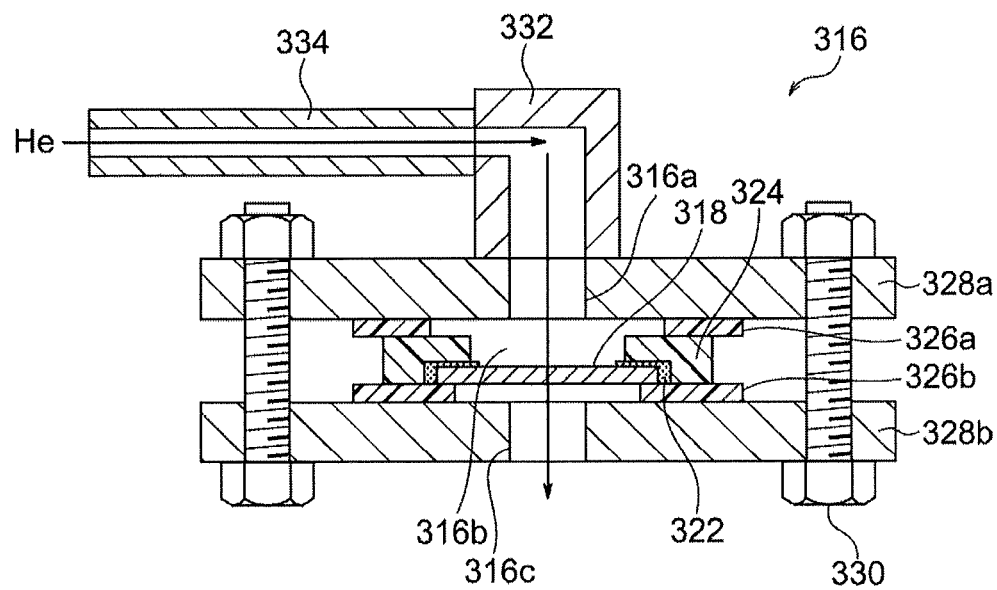
FIG. 3B is a schematic cross-sectional view of a sample holder and its peripheral configuration used in the measurement system shown in FIG. 3A.

A helium permeation test was conducted to evaluate the density of the LDH separator from the viewpoint of helium permeability. The helium permeability measurement system 310 shown in FIGS. 3A and 3B was constructed. The helium permeability measurement system 310 was configured to supply helium gas from a gas cylinder filled with helium gas to a sample holder 316 through the pressure gauge 312 and a flow meter 314 (digital flow meter), and to discharge the gas by permeating from one side to the other side of the LDH separator 318 held by the sample holder 316.

The sample holder 316 had a structure including a gas supply port 316a, a sealed space 316b and a gas discharge port 316c, and was assembled as follows: An adhesive 322 was applied along the outer periphery of the LDH separator 318 and bonded to a jig 324 (made of an ABS resin) having a central opening. Gaskets or sealing members 326a, 326b made of butyl rubber were disposed at the upper end and the lower end, respectively, of the jig 324, and then the outer sides of the members 326a, 326b were held with supporting members 328a, 328b (made of PTFE) each including a flange having an opening. Thus, the sealed space 316b was partitioned by the LDH separator 318, the jig 324, the sealing member 326a, and the supporting member 328a. The supporting members 328a and 328b were tightly fastened to each other with fastening means 330 with screws not to cause leakage of helium gas from portions other than the gas discharge port 316c. A gas supply pipe 334 was connected to the gas supply port 316a of the sample holder 316 assembled as above through a joint 332.

Helium gas was then supplied to the helium permeability measurement system 310 via the gas supply pipe 334, and the gas was permeated through the LDH separator 318 held in the sample holder 316. A gas supply pressure and a flow rate were then monitored with a pressure gauge 312 and a flow meter 314. After the permeation of helium gas for one to thirty minutes, the helium permeability was calculated. The helium permeability was calculated from the expression of F/(P×S) where F (cm$^3$/min) was the volume of permeated helium gas per unit time, P (atm) was the differential pressure applied to the LDH separator when helium gas permeated through, and S (cm$^2$) was the area of the membrane through which helium gas permeates. The permeation rate F (cm$^3$/min) of helium gas was read directly from the flow meter 314. The gauge pressure read from the pressure gauge 312 was used for the differential pressure P. Helium gas was supplied such that the differential pressure P was within the range of 0.05 to 0.90 atm.

Evaluation 6: Measurement of Ionic Conductivity

Figure 4:
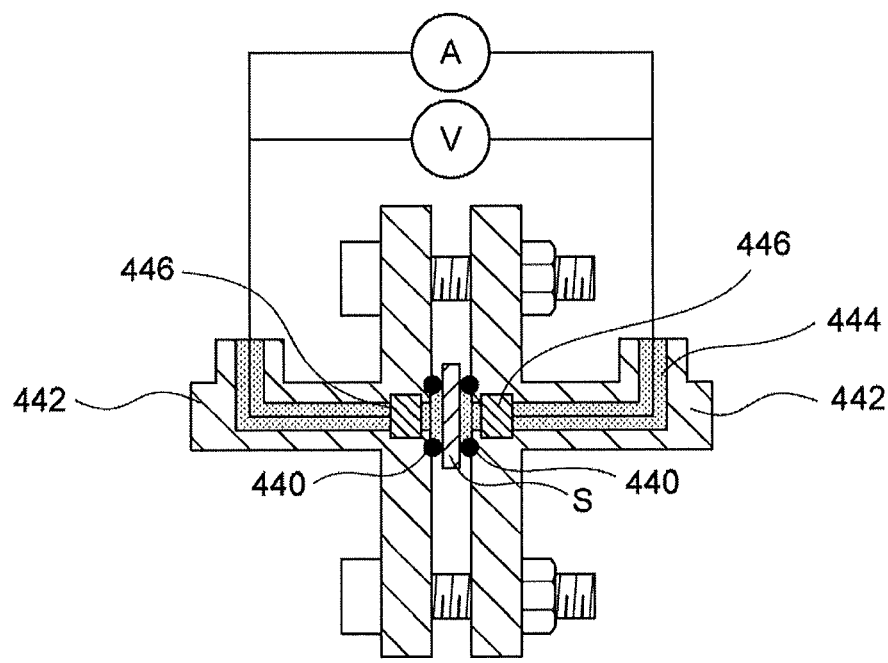
FIG. 4 is a schematic cross-sectional view illustrating an electrochemical measurement system used in Examples 1 to 4.

The conductivity of the LDH separator in the electrolytic solution was measured with an electrochemical measurement system shown in FIG. 4. A LDH separator sample S was sandwiched between two silicone gaskets 440 having a thickness of 1 mm and assembled into a PTFE flange-type cell 442 having an inner diameter of 6 mm. Electrodes 446 made of #100 nickel wire mesh were formed into a cylindrical shape having a diameter of 6 mm, and assembled into the cell 442, and the distance between the electrodes was 2.2 mm. The cell 442 was filled with 5.4M aqueous KOH solution as an electrolytic solution 444. Using the electrochemical measurement system (potentio-galvanostat frequency responsive analyzers 1287A and 1255B, manufactured by Solartron), the sample was subjected to measurement under the conditions of a frequency range of 1 MHz to 0.1 Hz and an applied voltage of 10 mV, and the resistance of the LDH separator sample S was determined from the intercept across a real number axis. The conductivity was calculated with the resistance, the thickness, and the area of the LDH separator.

Example 1

(1) Preparation of Polymeric Porous Substrate

A commercially available polypropylene porous substrate having a porosity of 70%, a mean pore size of 0.5 μm and a thickness of 80 μm was cut out into a size of 2.0 cm×2.0 cm.

(2) Coating of Alumina/Titania Sol on Polymeric Porous Substrate

An amorphous alumina solution (Al-ML15, manufactured by Taki Chemical Co., Ltd.) and a titanium oxide sol solution (M6, manufactured by Taki Chemical Co., Ltd.) were mixed at Ti/Al molar ratio of 2 to yield a mixed sol. The mixed sol was applied onto the substrate prepared in Process (1) by dip coating. In dip coating, the substrate was immersed in 100 mL of the mixed sol, pulled up vertically and dried in a dryer at 90° C. for five minutes.

(3) Preparation of Aqueous Raw Material Solution

Nickel nitrate hexahydrate (Ni(NO$_3$)$_2$.6H$_2$O, manufactured by Kanto Chemical Co., Inc.), and urea ((NH$_2$)$_2$CO, manufactured by Sigma-Aldrich Corporation) were provided as raw materials. Nickel nitrate hexahydrate was weighed to be 0.015 mol/L and placed in a beaker. Ion-exchanged water was added into a total volume of 75 mL. After stirring the solution, the urea weighed at a urea/NO$_3^-$ molar ratio of 16 was added, and further stirred to give an aqueous raw material solution.

(4) Formation of Membrane by Hydrothermal Treatment

The aqueous raw material solution and the dip-coated substrate were encapsulated into a Teflon™ autoclave (the internal volume: 100 mL, covered with stainless steel jacket). The substrate was horizontally fixed away from the bottom of the Teflon™ autoclave such that the solution was in contact with the two surfaces of the substrate. An LDH was then formed on the surface and the interior of the substrate by a hydrothermal treatment at a temperature of 120° C. for 24 hours. After a predetermined period, the substrate was removed from the autoclave, washed with ion-exchanged water, and dried at 70° C. for ten hours to form the LDH in the pores of porous substrate and give a composite material containing the LDH.

(5) Densification by Roll Pressing

The composite material containing the above LDH is sandwiched between a pair of PET films (Lumirror™ manufactured by Toray Industries, Inc., a thickness of 40 μm), and then roll-pressed at a rotation rate of 3 mm/s, at a roller temperature of 100° C., and with a gap between rollers of 70 μm to give a LDH separator.

(6) Results of Evaluation

The resultant LDH separator was evaluated in accordance with Evaluations 1 to 6. As a result of Evaluation 1, this LDH separator was identified as LDH (hydrotalcite compound). As a result of Evaluation 2, bubbling of helium gas was not observed in this LDH separator sample. The results of Evaluations 3 to 6 are shown in Table 1.

Example 2

A LDH separator was produced and evaluated as in Example 1 except that the roller temperature was 120° C. in the densification by the roll pressing in Process (5). As a result of Evaluation 1, this LDH separator was identified as LDH (hydrotalcite compound). As a result of Evaluation 2, bubbling of helium gas was not observed in this LDH separator. The results of Evaluations 3 to 6 are shown in Table 1.

Example 3

A LDH separator was produced and evaluated as in Example 1 except that the roller temperature was 120° C. and the gap between rollers was 50 μm in the densification by the roll pressing in Process (5). As a result of Evaluation 1, this LDH separator was identified as LDH (hydrotalcite compound). As a result of Evaluation 2, bubbling of helium gas was not observed in this LDH separator. The results of Evaluations 3 to 6 are shown in Table 1.

Example 4 (Comparative)

A LDH separator was produced and evaluated as in Example 1 except that the densification by the roll pressing in Process (5) was not performed. As a result of Evaluation 1, this LDH separator is identified as LDH (hydrotalcite compound). As a result of Evaluation 2, bubbling of helium gas was observed in this LDH separator. The results of Evaluations 3 to 6 are as shown in Table 1, and short circuiting caused by zinc dendrites occurred in this LDH separator.

Example 5

A LDH separator was produced and evaluated as in Example 1 except for the following conditions a) and b).

a) Magnesium nitrate hexahydrate $(Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, the urea weighed at a urea/$NO_3^-$ molar ratio of 8 was added, and further stirred to give an aqueous raw material solution.

b) The hydrothermal temperature in Process (4) was 90° C. As a result of Evaluation 1, this LDH separator was identified as LDH (hydrotalcite compound). As a result of Evaluation 2, bubbling of helium gas was not observed in this LDH separator. The results of Evaluations 3 to 6 are shown in Table 1.

Example 6

A LDH separator was produced and evaluated as in Example 1 except for the following conditions a) to c).

a) Magnesium nitrate hexahydrate $(Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, urea weighing at a urea/$NO_3^-$ molar ratio of 8 was added, and further stirred to give an aqueous raw material solution.

b) The hydrothermal temperature in Process (4) was 90° C. c) The roller temperature was 120° C. in the densification by the roll pressing in Process (5).

As a result of Evaluation 1, this LDH separator was identified as LDH (hydrotalcite compound). As a result of Evaluation 2, bubbling of helium gas was not observed in this LDH separator. The results of Evaluations 3 to 6 are shown in Table 1.

Example 7

A LDH separator was produced and evaluated as in Example 1 except for the following conditions a) to c).

a) Magnesium nitrate hexahydrate $(Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, urea weighing at a urea/$NO_3^-$ molar ratio of 8 was added, and further stirred to give an aqueous raw material solution.

b) The hydrothermal temperature in Process (4) was 90° C.

c) The roller temperature was 120° C. and the gap between rollers was 50 μm in the densification by the roll pressing in Process (5).

As a result of Evaluation 1, this LDH separator was identified as LDH (hydrotalcite compound). As a result of Evaluation 2, bubbling of helium gas was not observed in this LDH separator. The results of Evaluations 3 to 6 are shown in Table 1.

Example 8 (Comparative)

A LDH separator was produced and evaluated as in Example 1 except for the following conditions a) to c).

a) Magnesium nitrate hexahydrate $(Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, urea weighing at a urea/$NO_3^-$ molar ratio of 8 was added, and further stirred to give an aqueous raw material solution.

b) The hydrothermal temperature in Process (4) was 90° C.

c) The densification by the roll pressing in Process (5) was not performed.

As a result of Evaluation 1, this LDH separator was identified as LDH (hydrotalcite compound). As a result of Evaluation 2, bubbling of helium gas was observed in this LDH separator. The results of Evaluations 3 to 6 are shown in Table 1.

Example 9

A LDH separator was produced and evaluated as in Example 1 except for the following conditions a) to c).

a) The polymeric porous substrate used in Process (1) was a commercially available polyethylene porous substrate having a porosity of 70%, a mean pore diameter of 0.5 μm and a thickness of 80 μm.

b) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total amount of 75 mL. After stirring the resultant solution, urea weighing at a urea/$NO_3^-$ molar ratio of 8 was added, and further stirred to give an aqueous raw material solution.

c) The hydrothermal temperature in Process (4) was 90° C.

As a result of Evaluation 1, this LDH separator was identified as LDH (hydrotalcite compound). As a result of Evaluation 2, bubbling of helium gas was not observed in this LDH separator. The results of Evaluations 3 to 6 are shown in Table 1.

Example 10

A LDH separator was produced and evaluated as in Example 1 except for the following conditions a) to d).

a) The polymeric porous substrate used in Process (1) was a commercially available polyethylene porous substrate having a porosity of 70%, a mean pore diameter of 0.5 μm and a thickness of 80 μm.

b) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, urea weighing at a urea/$NO_3^-$ molar ratio of 8 was added, and further stirred to give an aqueous raw material solution.

c) The hydrothermal temperature in Process (4) was 90° C.

d) The roller temperature was 120° C. in the densification by the roll pressing in Process (5).

As a result of Evaluation 1, this LDH separator was identified as LDH (hydrotalcite compound). As a result of Evaluation 2, bubbling of helium gas was not observed in this LDH separator. The results of Evaluations 3 to 6 are shown in Table 1.

Example 11

A LDH separator was produced and evaluated as in Example 1 except for the following conditions a) to d).

a) A commercially available polyethylene porous substrate having a porosity of 70%, a mean pore diameter of 0.5 μm and a thickness of 80 μm was used as the polymeric porous substrate in Process (1).

b) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, urea weighing at a urea/$NO_3^-$ molar ratio of 8 was added, and further stirred to give an aqueous raw material solution.

c) The hydrothermal temperature in Process (4) was 90° C.

d) The roller temperature was 120° C. and the gap between rollers was 50 μm in the densification by the roll pressing in Process (5).

As a result of Evaluation 1, this LDH separator was identified as LDH (hydrotalcite compound). As a result of Evaluation 2, bubbling of helium gas was not observed in this LDH separator. The results of Evaluations 3 to 6 are shown in Table 1.

Example 12 (Comparative)

A LDH separator was produced and evaluated as in Example 1 except for the following conditions a) to d).

a) A commercially available polyethylene porous substrate having a porosity of 70%, a mean pore diameter of 0.5 μm and a thickness of 80 μm was used as the polymeric porous substrate in Process (1).

b) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, urea weighing at a urea/$NO_3^-$ molar ratio of 8 was added, and further stirred to give an aqueous raw material solution.

c) The hydrothermal temperature in process (4) was 90° C.

d) The densification by the roll pressing in Process (5) was not performed.

As a result of Evaluation 1, this LDH separator was identified as LDH (hydrotalcite compound). As a result of Evaluation 2, bubbling of helium gas was observed in this LDH separator. The results of Evaluations 3 to 6 are shown in Table 1.

Example 13

A LDH separator was produced and evaluated as in Example 1 except for the following condition a) to d).

a) A commercially available polyethylene porous substrate having a porosity of 40%, a mean pore diameter of 0.5 μm and a thickness of 25 μm was used as the polymeric porous substrate in Process (1).

b) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, urea weighing at a urea/$NO_3^-$ molar ratio of 8 was added, and further stirred to give an aqueous raw material solution.

c) The hydrothermal temperature in Process (4) was 90° C.

d) The roller temperature was 120° C. and the gap between rollers was 50 μm in the densification by the roll pressing in Process (5).

As a result of Evaluation 1, this LDH separator was identified as LDH (hydrotalcite compound). As a result of Evaluation 2, bubbling of helium gas was not observed in this LDH separator. The results of Evaluations 3 to 6 are shown in Table 1.

Example 14

A LDH separator was produced and evaluated as in Example 1 except for the following conditions a) to d).

a) A commercially available polyethylene porous substrate having a porosity of 40%, a mean pore diameter of 0.5 μm and a thickness of 25 μm was used as the polymeric porous substrate in Process (1).

b) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, urea weighing at a urea/$NO_3^-$ molar ratio of 8 was added, and further stirred to give an aqueous raw material solution.

c) The hydrothermal temperature in Process (4) was 90° C.

d) The roller temperature was 140° C. and the gap between rollers was 60 μm in the densification by the roll pressing in Process (5).

As a result of Evaluation 1, this LDH separator was identified as LDH (hydrotalcite compound). As a result of Evaluation 2, bubbling of helium gas was not observed in this LDH separator. The results of Evaluations 3 to 6 are shown in Table 1.

Example 15 (Comparative)

A LDH separator was produced and evaluated as in Example 1 except for the following conditions a) to d).

a) A commercially available polyethylene porous substrate having a porosity of 40%, a mean pore diameter of 0.5 μm and a thickness of 25 μm was used as the polymeric porous substrate in Process (1).

b) Magnesium nitrate hexahydrate ($Mg(NO_3)_2 \cdot 6H_2O$, manufactured by Kanto Chemical Co., Ltd.) was used instead of the nickel nitrate hexahydrate in Process (3), weighed to be 0.03 mol/L, and placed in a beaker. Ion-exchanged water was added into a total volume of 75 mL. After stirring the resultant solution, urea weighing at a urea/$NO_3^-$ molar ratio of 8 was added, and further stirred to give an aqueous raw material solution.

c) The hydrothermal temperature in Process (4) was 90° C.

d) The densification by the roll pressing in Process (5) was not performed.

As a result of Evaluation 1, this LDH separator was identified as LDH (hydrotalcite compound). As a result of Evaluation 2, bubbling of helium gas was observed in this LDH separator. The results of Evaluations 3 to 6 are shown in Table 1.

TABLE 1

|  | Roll pressing conditions | | Evaluations | | | |
|---|---|---|---|---|---|---|
|  | Roller Temp. (° C.) | Roller gap (μm) | Linear transmittance (%) @1000 nm | Helium permeability (cm/atm · min) | Ionic conductivity (mS/cm) | Short circuit caused by dendrites |
| Ex. 1 | 100 | 70 | 3 | 2.3 | 2.4 | not found |
| Ex. 2 | 120 | 70 | 31 | 0 | 2.3 | not found |
| Ex. 3 | 120 | 50 | 61 | 0 | 2.1 | not found |
| Ex. 4* | n/a | n/a | 0 | 560 | 2.8 | found |
| Ex. 5 | 100 | 70 | 3 | 1.8 | 2.5 | not found |
| Ex. 6 | 120 | 70 | 29 | 0 | 2.4 | not found |
| Ex. 7 | 120 | 50 | 63 | 0 | 2.1 | not found |
| Ex. 8* | n/a | n/a | 0 | 548 | 2.8 | found |
| Ex. 9 | 100 | 70 | 4 | 1.5 | 2.4 | not found |
| Ex. 10 | 120 | 70 | 33 | 0 | 2.2 | not found |
| Ex. 11 | 120 | 50 | 64 | 0 | 2.0 | not found |
| Ex. 12* | n/a | n/a | 0 | 530 | 2.7 | found |
| Ex. 13 | 120 | 50 | 61 | 0 | 2.3 | not found |
| Ex. 14 | 140 | 60 | 73 | 0 | 2.1 | not found |
| Ex. 15* | n/a | n/a | 0 | 513 | 2.6 | found |

*Comparative example

What is claimed is:

1. A layered double hydroxide (LDH) separator comprising a porous substrate made of a polymer material and LDH plugging pores of the porous substrate, said separator having a linear transmittance of 5% or more at a wavelength of 1000 nm, wherein the porous substrate is filled with the LDH over the full thickness of the porous substrate, the thickness being taken along a cross section of the porous substrate.

2. The LDH separator according to claim 1, having a linear transmittance of 10% or more at a wavelength of 1000 nm.

3. The LDH separator according to claim 1, having a helium permeability per unit area of 3.0 cm/atm·min or less.

4. The LDH separator according to claim 1, having an ionic conductivity of 0.1 mS/cm or more.

5. The LDH separator according to claim 1, wherein the polymer material is selected from the group consisting of polystyrene, poly(ether sulfone), polypropylene, epoxy resin, poly(phenylene sulfide), fluorocarbon resin, cellulose, nylon, and polyethylene.

6. The LDH separator according to claim 1, consisting of the porous substrate and the LDH.

7. A secondary zinc battery comprising the LDH separator according to claim 1.

* * * * *